US011944591B2

(12) United States Patent
Dosanjh

(10) Patent No.: US 11,944,591 B2
(45) Date of Patent: Apr. 2, 2024

(54) DUAL SPOUT PILL STORAGE AND SWALLOWING ASSIST BOTTLE DEVICE

(71) Applicant: Hervina Dosanjh, Etobicoke (CA)

(72) Inventor: Hervina Dosanjh, Etobicoke (CA)

( * ) Notice: Subject to any disclaimer, the term of this patent is extended or adjusted under 35 U.S.C. 154(b) by 0 days.

(21) Appl. No.: 17/927,721

(22) PCT Filed: May 21, 2021

(86) PCT No.: PCT/CA2021/050697

§ 371 (c)(1),
(2) Date: Nov. 24, 2022

(87) PCT Pub. No.: WO2021/237341

PCT Pub. Date: Dec. 2, 2021

(65) Prior Publication Data

US 2023/0225946 A1 Jul. 20, 2023

Related U.S. Application Data

(63) Continuation-in-part of application No. 16/882,674, filed on May 25, 2020, now Pat. No. 11,160,729.

(51) Int. Cl.

| | |
|---|---|
| ***A61J 7/00*** | (2006.01) |
| ***B65D 23/12*** | (2006.01) |
| ***B65D 47/08*** | (2006.01) |
| ***B65D 47/14*** | (2006.01) |

(52) U.S. Cl.

CPC ........... *A61J 7/0046* (2013.01); *A61J 7/0038* (2013.01); *A61J 7/0061* (2013.01); *B65D 23/12* (2013.01); *B65D 47/0857* (2013.01); *B65D 47/14* (2013.01)

(58) Field of Classification Search

CPC ...... A61J 7/0046; A61J 7/0038; A61J 7/0061; B65D 23/12; B65D 47/0857; B65D 47/14

See application file for complete search history.

(56) References Cited

U.S. PATENT DOCUMENTS

| | | | |
|---|---|---|---|
| 2,656,837 A | 10/1953 | Bryan | |
| 2,940,447 A | 6/1960 | Zanegood | |
| 3,331,369 A * | 7/1967 | Keck | A61J 7/0046 D7/509 |

(Continued)

FOREIGN PATENT DOCUMENTS

| | | | |
|---|---|---|---|
| CA | 2487432 A1 | 12/2003 |
| CN | 113081845 A | 7/2021 |

(Continued)

OTHER PUBLICATIONS

International Search Report issued by the Canadian Intellectual Property Office dated Aug. 25, 2021 in connection with PCT International Patent Application No. PCT/CA2021/050697 filed on May 21, 2021, 5 pages.

(Continued)

*Primary Examiner* — Donnell A Long

(57) ABSTRACT

The present disclosure generally relates to a dual spout pill storage and swallowing assist bottle device intended to be carried by a user. The bottle device includes two distinct drinking spouts and is configured to allow a user to both drink from the bottle device as normal and also drink from the bottle in a way to assist the user with swallowing a pill.

12 Claims, 9 Drawing Sheets

(56) References Cited

U.S. PATENT DOCUMENTS

| | | | | | |
|---|---|---|---|---|---|
| 3,418,999 | A * | 12/1968 | Davis | A61J 7/0061 600/20 |
| 3,954,207 | A | 5/1976 | Gerding et al. | |
| 4,792,333 | A | 12/1988 | Kidder | |
| 5,154,318 | A * | 10/1992 | Lampard | A61J 7/0023 222/105 |
| 5,238,140 | A | 8/1993 | Maze | |
| 5,718,681 | A | 2/1998 | Manning | |
| 7,100,797 | B2 | 9/2006 | Kahn et al. | |
| D542,139 | S | 5/2007 | Welter | |
| 7,753,226 | B2 | 7/2010 | Chauvin | |
| 8,231,067 | B1 | 7/2012 | Robinson | |
| D764,232 | S | 8/2016 | Marina et al. | |
| D803,064 | S | 11/2017 | Marina et al. | |
| 10,370,175 | B2 | 8/2019 | Paz | |
| D891,868 | S | 8/2020 | Karl, IV et al. | |
| 2004/0154955 | A1 | 8/2004 | Friar et al. | |
| 2005/0103879 | A1 | 5/2005 | Robinson | |
| 2006/0011639 | A1 | 1/2006 | Heilos | |
| 2007/0193913 | A1* | 8/2007 | Schroeder | B65B 61/202 215/10 |
| 2008/0296181 | A1 | 12/2008 | Stephens et al. | |
| 2011/0224604 | A1 | 9/2011 | Showers | |
| 2015/0005702 | A1 | 1/2015 | Soper | |
| 2015/0088059 | A1* | 3/2015 | Soper | A61J 7/0046 604/78 |
| 2017/0000691 | A1* | 1/2017 | Crawford | A61J 7/0046 |
| 2017/0043916 | A1 | 2/2017 | Seiders et al. | |
| 2017/0121069 | A1 | 5/2017 | Clements et al. | |
| 2019/0084734 | A1 | 3/2019 | Ni | |
| 2019/0092527 | A1 | 3/2019 | Giuili | |
| 2020/0255194 | A1 | 8/2020 | Li | |

FOREIGN PATENT DOCUMENTS

| | | | |
|---|---|---|---|
| FR | 3002127 | A1 | 8/2014 |
| GB | 2217209 | A | 10/1989 |
| GB | 2509918 | A | 7/2014 |
| JP | 2010018281 | A | 1/2010 |
| WO | 2004/047715 | A1 | 6/2004 |
| WO | 2020/183003 | A1 | 9/2020 |

OTHER PUBLICATIONS

Written Opinion of the International Searching Authority issued by the Canadian Intellectual Property Office dated Aug. 25, 2021 in connection with PCT International Patent Application No. PCT/CA2021/050697 filed on May 21, 2021, 7 pages.

Kathryn Watson, Healthline Media, "How to Swallow a Pill: 8 Methods Worth Trying", https://www.healthline.com/health/how-to-swallow-a-pill, May 20, 2019, © 2005-2021 Healthline Media (a Red Ventures Company), 36 pages.

Horizon Design and Manufacturing LLC, "Medi+Straw", https://medistraw.com/facts/, © 2006 Horizon Design and Manufacturing LLC, © 2005 Medi+Straw, known at least as early as Jan. 10, 2020, 7 pages.

Oralflo Technologies, LLC, "Oralflo", https://oralflo.com/about-oralflo/, © 2014 Oralflo Technologies, known at least as early as Jan. 10, 2020, 3 pages.

Bionix LLC, "Safestraw", https://bionix.com/safestraw.html, © 2021 Bionix LLC, known at least as early as Jan. 10, 2020, 3 pages.

https://www.amazon.com/Synergy-Water-Bottle-Pill-Organizer/dp/B08LGK4CL9/ref=sr_1_21?crid=11QDACPAPUKC3&keywords=dual%2Bspout%2Bpill%2Bstorage%2Bbottle&qid=1650396150&sprefix=dual%2Bspout%2Bpill%2Bstorage%2Bbottle%2B%2Caps%2C147&sr=8-21&th=1, Jan. 12, 2021 (Year. 2021), 3 pages.

International Search Report issued by the Canadian Intellectual Property Office dated Jul. 21, 2023 in connection with PCT International Patent Application No. PCT/CA2022/051761 filed on Dec. 1, 2022, 4 pages.

Written Opinion of the International Searching Authority issued by the Canadian Intellectual Property Office dated Jul. 21, 2023 in connection with PCT International Patent Application No. PCT/CA2022/051761 filed on Dec. 1, 2022, 5 pages.

* cited by examiner

DUAL SPOUT PILL STORAGE AND SWALLOWING ASSIST BOTTLE DEVICE

CROSS-REFERENCE TO RELATED APPLICATIONS

This application is a National Phase Entry of international PCT Patent Application Serial No. PCT/CA2021/050697 filed on May 21, 2021 by Hervina DOSANJH designating the United States, which is a continuation-in-part and claims the benefit of U.S. Utility patent application Ser. No. 16/882,674 filed on May 25, 2020 (now U.S. Pat. No. 11,160,729 issued on Nov. 2, 2021). The contents of the aforementioned applications are incorporated by reference herein.

TECHNICAL FIELD OF THE INVENTION

The present invention relates in general to drink bottles, and, more specifically, to a dual spout pill storage and swallowing assist bottle device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

A fluid bottle, or water bottle, is a container used for holding liquids, such as water or other beverages, for consumption. The use of a fluid bottle allows a user to drink and transport the beverage contained within from one place to another. Such fluid bottles are often made from plastic, glass, or metal, and are made available in a variety of shapes, sizes, and compositions. For example, a fluid bottle may be designed as a soft-plastic, disposable bottle having a pop-cap or a screw-cap for easy use and low cost. As another example, a fluid bottle may be shaped as a hard-plastic or metal, reusable bottle having a removably attached lid with an opening for pouring or drinking the beverage itself. Such fluid bottles may be more expensive, though are resilient enough to be cleaned, refilled, and used for a long period of time.

Reusable fluid bottles and their components tend to be made from some combination of high-density polyethylene (HDPE), low-density polyethylene (LDPE), copolyester, polypropylene, stainless steel, or aluminum. Such materials provide the advantages to the fluid bottle of being durable, light weight, dishwasher safe, and retaining minimal odor and taste from previous beverages stored therein. Some fluid bottles may further incorporate a plastic resin or epoxy liner layer between the outer material of the bottle and the contents within. Other fluid bottles may even incorporate a thermal insulation layer to maintain the temperature of the beverage.

A pill, or tablet, is a generally solid oral dosage form of some composition, which may be a pharmaceutical mixture, a homeopathic composition, a supplement, or any other material desired to be ingested without chewing. Pills are most often prepared in the form of rounded discs, cylindrical capsules, and even angular shapes that are meant to be swallowed by an action that avoids the user choking on or inhaling the pill. Such swallowing action, though, may often be difficult to perform, and a number of users have chronic difficulty swallowing pills for reasons as varied as the large size of the pill, poor swallowing technique, physiological limitations, or even emotional or mental inhibitions.

To overcome such difficulties a number of techniques have been implemented that aid in the swallowing action. One such technique is to chop up or grind up the pill and mix the ingredients with food or water. Such a technique, though, has the negative effect of reducing the amount of the composition actually ingested, diluting the composition into the food or water, and reducing the ability for the composition to pass from the gastrointestinal tract into the bloodstream.

Another technique often used is to swallow the pill whole with the assistance of a drink of some fluid. This technique employs the advantage of lubricating both the pill and the upper gastrointestinal tract, though is not the most effective method for swallowing. Some downsides to this technique involve partially dissolving the pill before it fully enters the gastrointestinal tract, or even altering the physiology of the gastrointestinal tract, as in the case of too alkaline or too acidic fluids, and reducing the effectiveness of the composition.

A more modem and highly recommended technique is to place the pill in a user's oral cavity or in a specialized container, and then drink fluid through a straw to vacuum the pill into the gastrointestinal tract. Such a straw-assisted technique employs negative pressure generated by the sucking action to overcome the user's swallowing difficulties. When combined with the use of water as the primary drink fluid this technique is considered very effective, having few negative attributes.

Few solutions exist for allowing a user to employ the straw-assisted technique of swallowing pills. The standard method of using this technique would be for a user to place a pill on their tongue and then drink a fluid through a standardized straw. Some specialized straws exist that simultaneously hold a pill and allow a fluid to be sucked through the straw, often by employing some pill support structure and fluid inlet combination. These specialized straws may be used to drink fluid from any fluid container or even a fluid bottle if the bottle accommodates the straw. No solution exists, though, that combines a fluid container bottle with a specialized pill straw for allowing a user to, alternatively, either drink fluid by normal means or drink fluid through the specialize pill swallowing straw to aid in pill swallowing.

Thus, there is a need in the art for a dual spout pill storage and swallowing assist bottle device that may be carried by a user so as to provide the convenience of a water bottle while also incorporating a specialized component for aiding the user in storing pills for traveling and swallowing pills. It is to these ends that the present invention has been developed.

BRIEF SUMMARY OF THE INVENTION

To minimize the limitations in the prior art, and to minimize other limitations that will be apparent upon reading and understanding the present specification, the present invention describes a dual spout pill storage and swallowing assist bottle device.

It is an objective of the present invention to provide a dual spout pill storage and swallowing assist bottle device that may comprise a fluid container.

It is another objective of the present invention to provide a dual spout pill storage and swallowing assist bottle device that may comprise a water bottle.

It is another objective of the present invention to provide a dual spout pill storage and swallowing assist bottle device that may comprise a dual spout lid.

It is another objective of the present invention to provide a dual spout pill storage and swallowing assist bottle device that may comprise a drinking spout.

It is another objective of the present invention to provide a dual spout pill storage and swallowing assist bottle device that may comprise a drinking spout cap.

It is another objective of the present invention to provide a dual spout pill storage and swallowing assist bottle device that may comprise a pill straw spout.

It is another objective of the present invention to provide a dual spout pill storage and swallowing assist bottle device that may comprise a pill straw.

It is another objective of the present invention to provide a dual spout pill storage and swallowing assist bottle device that may comprise a storage compartment.

It is another objective of the present invention to provide a dual spout pill storage and swallowing assist bottle device that may comprise a resilient material of construction.

It is another objective of the present invention to provide a dual spout pill storage and swallowing assist bottle device that may comprise a water-proof material of construction.

It is another objective of the present invention to provide a dual spout pill storage and swallowing assist bottle device that may comprise a reusable material of construction.

It is another objective of the present invention to provide a dual spout pill storage and swallowing assist bottle device that may comprise a washable material of construction.

It is another objective of the present invention to provide a dual spout pill storage and swallowing assist bottle device that may comprise a multi-component construction.

It is another objective of the present invention to provide a dual spout pill storage and swallowing assist bottle device that may comprise an antimicrobial layer.

It is another objective of the present invention to provide a dual spout pill storage and swallowing assist bottle device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The dual spout pill storage and swallowing assist bottle device is intended to be carried by a user and provide a mobile source of fluids, as in the case of a fluid bottle. The device provides two distinct drinking spouts and is configured to allow a user to both drink from the bottle as normal and drink from the bottle in a way to assist the user with swallowing pills. To perform these dual functions the dual spout pill storage and swallowing assist bottle device comprises a standard drinking spout and a pill straw with a reversibly deployable spout incorporated into the lid of the device. By this design, the device may be used to drink fluids without hindrance as desired, and to also facilitate a straw-assisted vacuum swallowing of a pill when needed. The device may further comprise a storage compartment for carrying pills and other items, and may further comprise a pill retaining insert for the standard spout.

Figure 1:
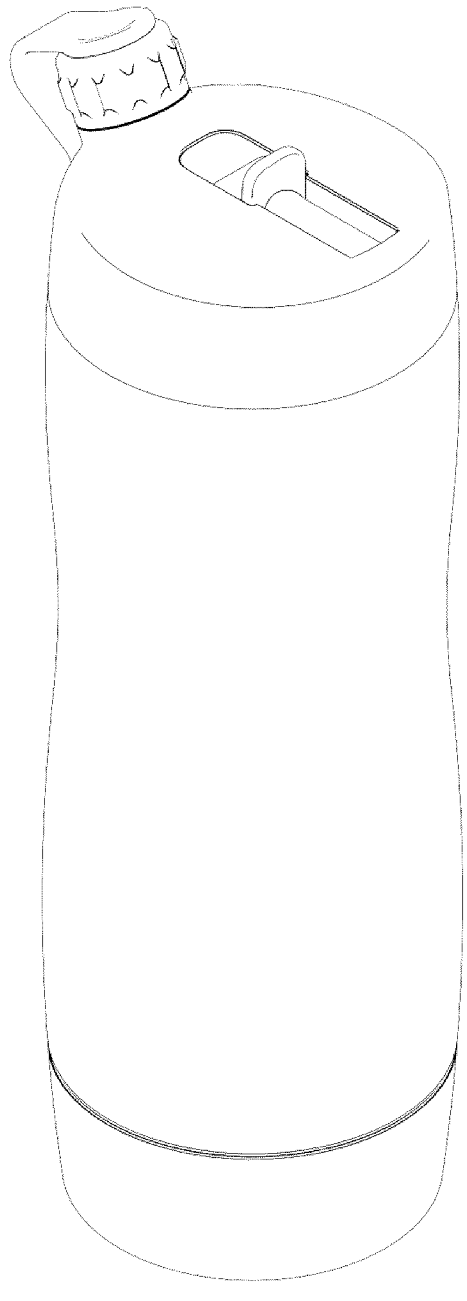
FIG. 1 is an isometric perspective view of a dual spout pill storage and swallowing assist bottle device, as contemplated by the present disclosure.
Figure 2:
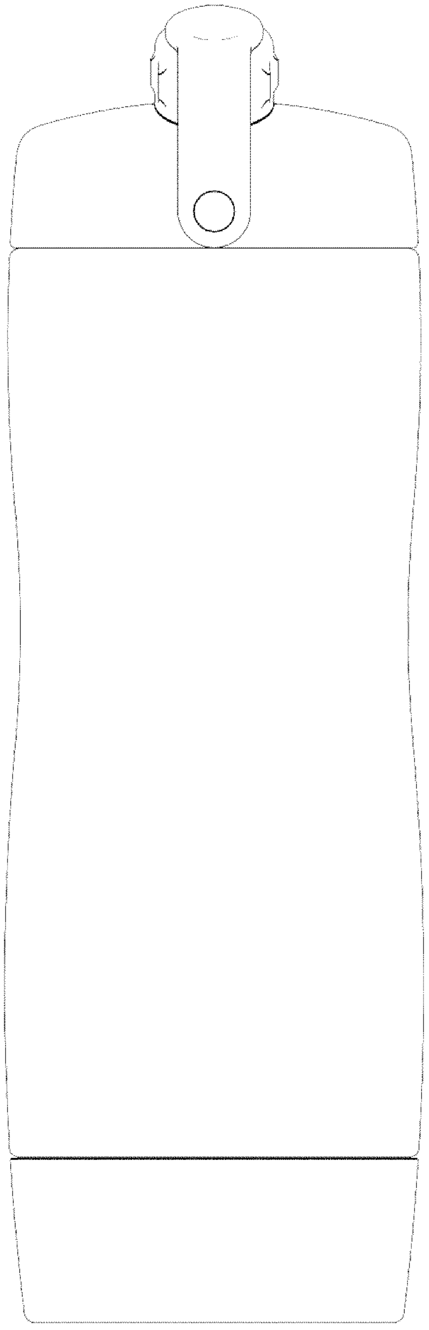
FIG. 2 is a front perspective view of a dual spout pill storage and swallowing assist bottle device, as contemplated by the present disclosure.
Figure 3:
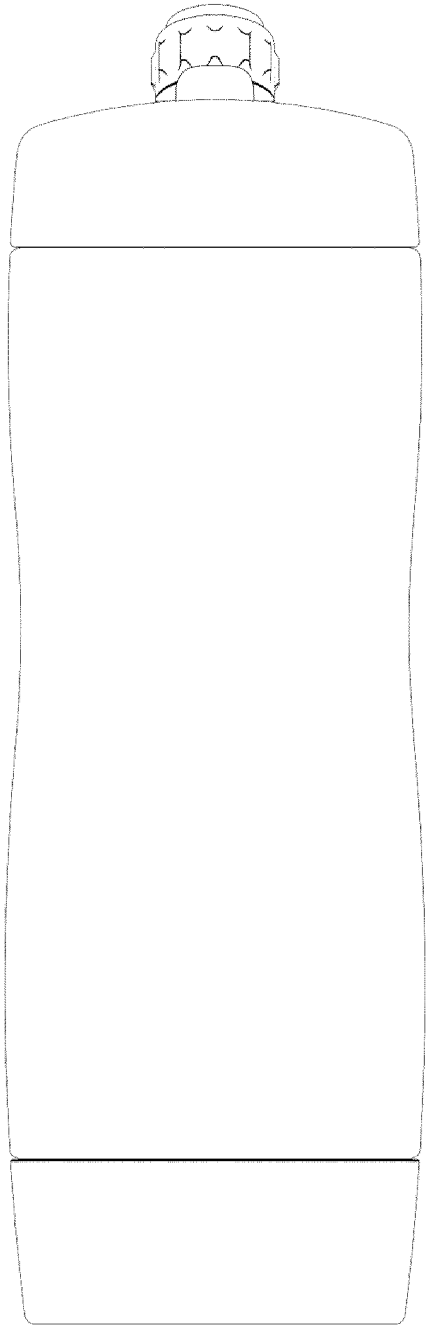
FIG. 3 is a rear perspective view of a dual spout pill storage and swallowing assist bottle device, as contemplated by the present disclosure.
Figure 4:
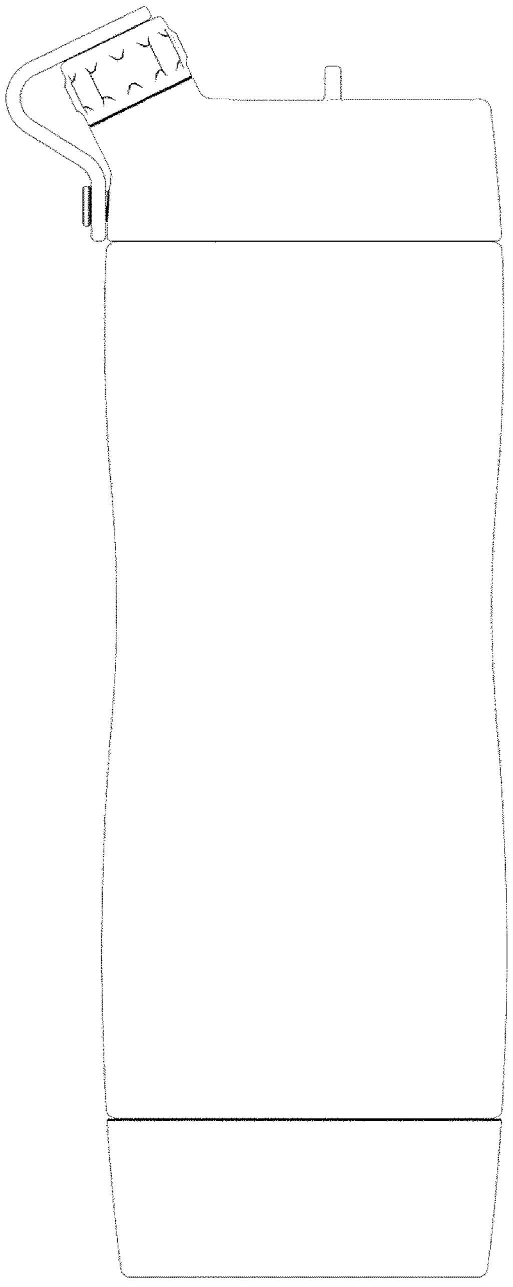
FIG. 4 is a left side elevation view of a dual spout pill storage and swallowing assist bottle device, as contemplated by the present disclosure.
Figure 5:
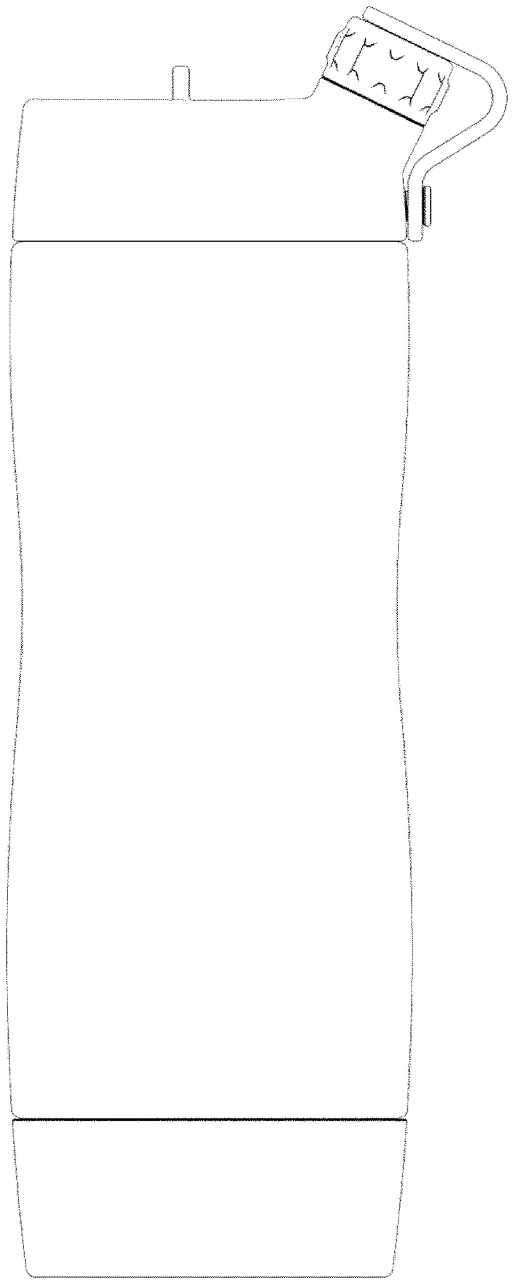
FIG. 5 is a right side elevation view of a dual spout pill storage and swallowing assist bottle device, as contemplated by the present disclosure.
Figure 6:
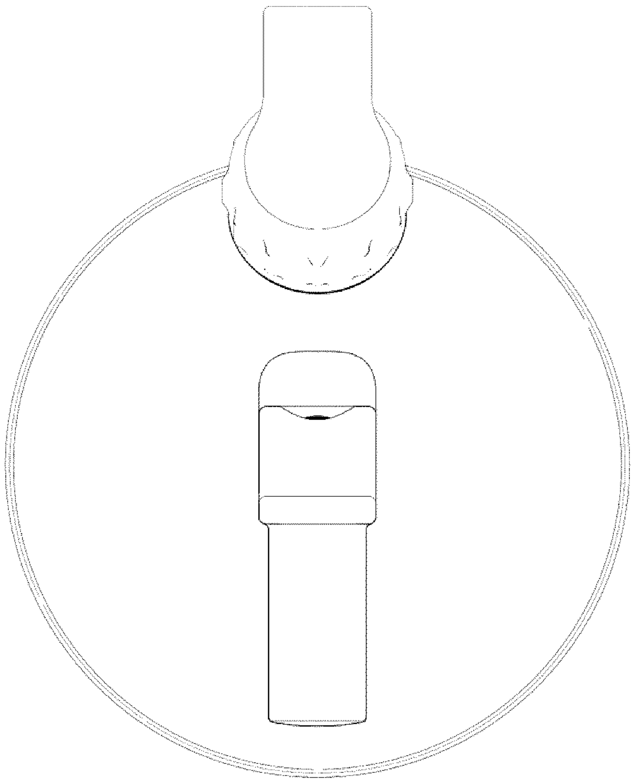
FIG. 6 is a top plan view of a dual spout pill storage and swallowing assist bottle device, as contemplated by the present disclosure.
Figure 7:
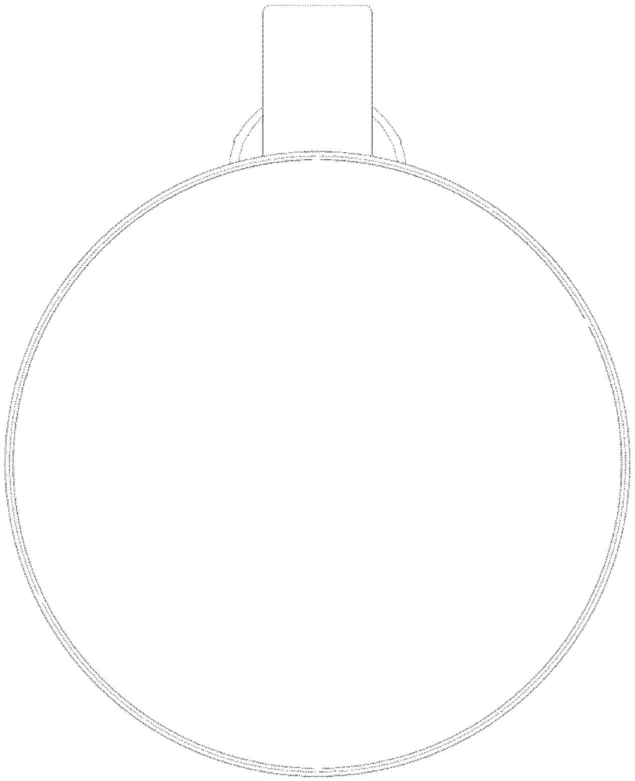
FIG. 7 is a bottom plan view of a dual spout pill storage and swallowing assist bottle device, as contemplated by the present disclosure.
Figure 8:
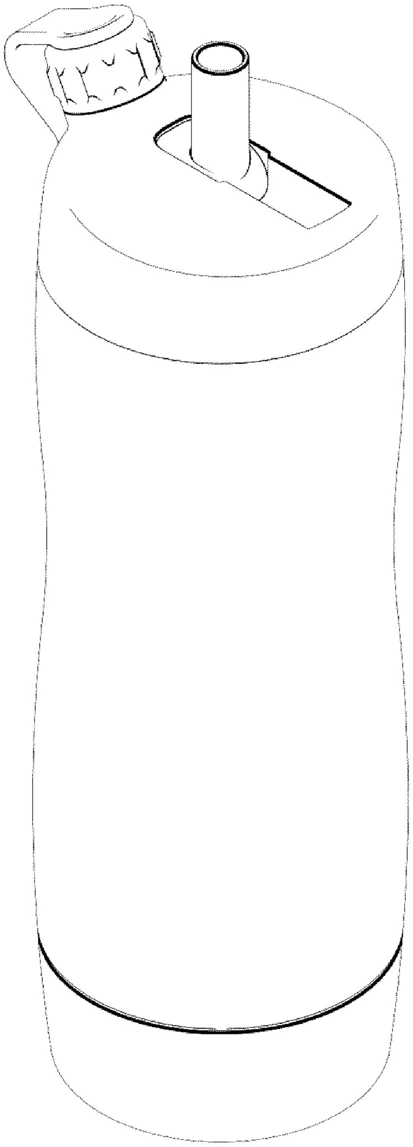
FIG. 8 is an isometric perspective view of a dual spout pill storage and swallowing assist bottle device with its pill straw spout extended, as contemplated by the present disclosure.
Figure 9:
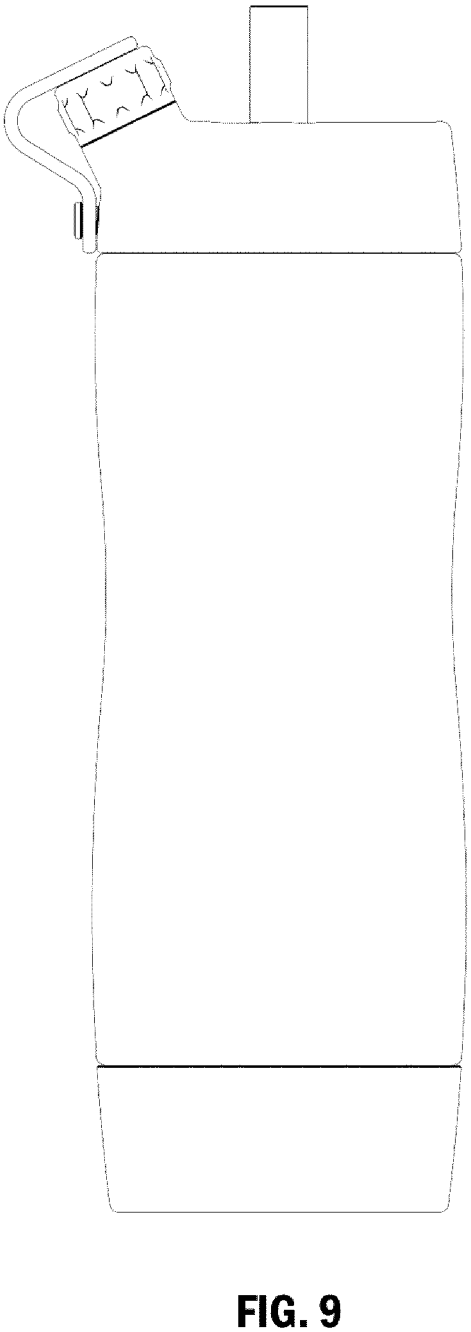
FIG. 9 is a left side elevation view of a dual spout pill storage and swallowing assist bottle device with its pill straw spout extended, as contemplated by the present disclosure.
Figure 10:
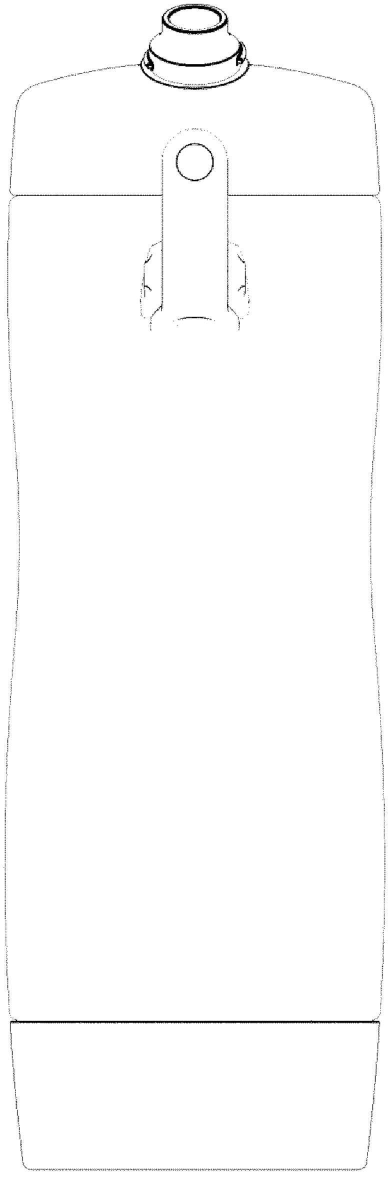
FIG. 10 is a front perspective view of a dual spout pill storage and swallowing assist bottle device with its drinking spout cap disengaged from the drinking spout, as contemplated by the present disclosure.
Figure 11:
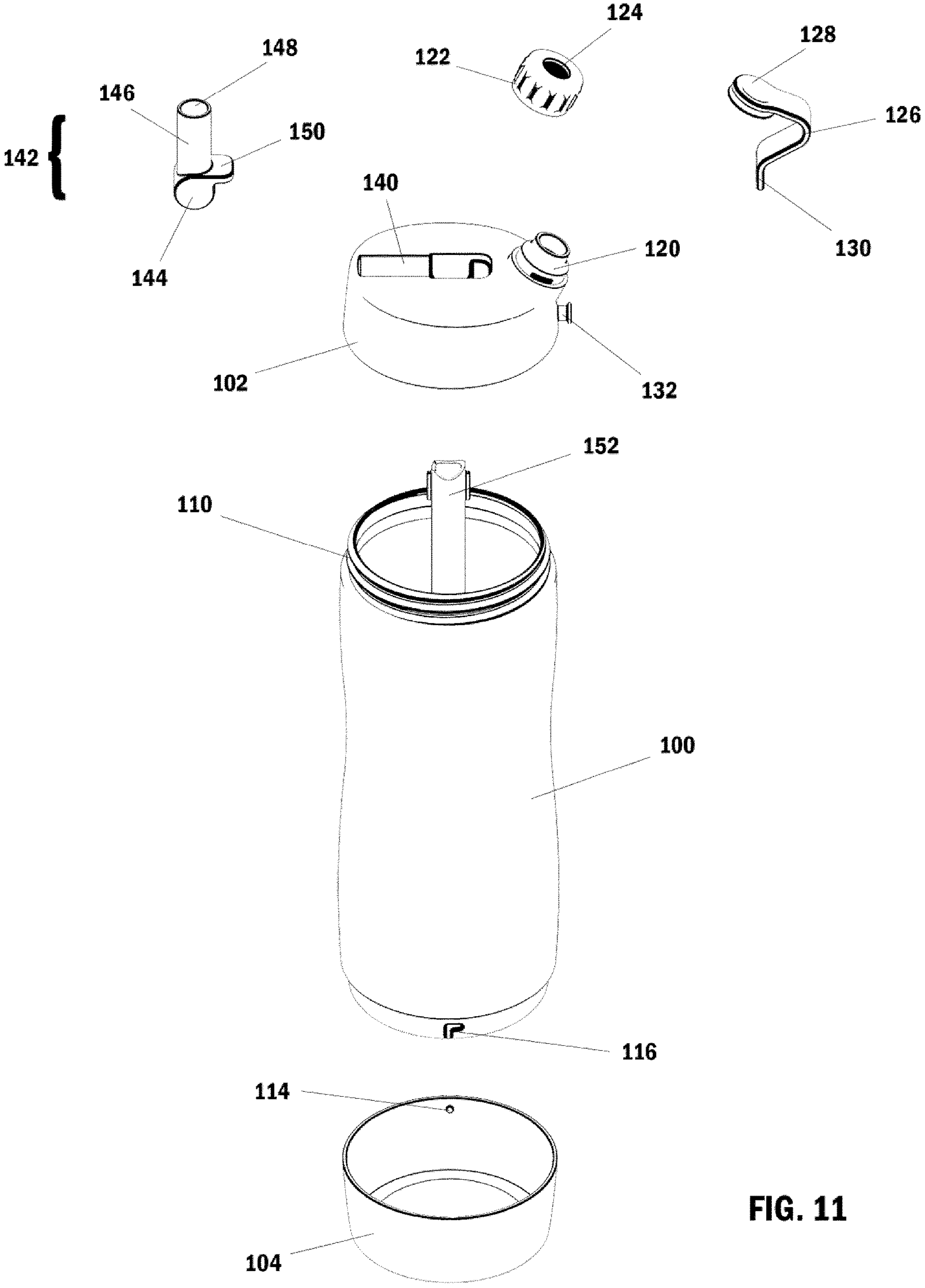
FIG. 11 is an exploded component view of a dual spout pill storage and swallowing assist bottle device, as contemplated by the present disclosure.
Figure 12:
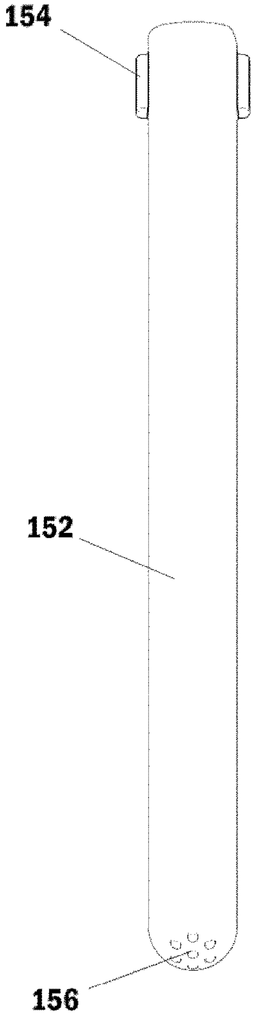
FIG. 12 is a detailed view of a pill straw of a dual spout pill storage and swallowing assist bottle device, as contemplated by the present disclosure.
Figure 13:
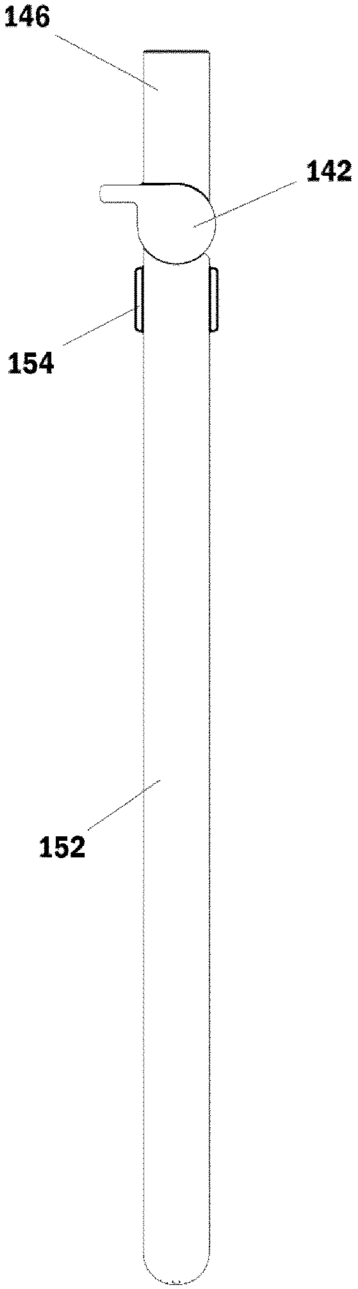
FIG. 13 is a detailed view of a pill straw and pill straw spout combination in drinking orientation of a dual spout pill storage and swallowing assist bottle device, as contemplated by the present disclosure.
Figure 14:
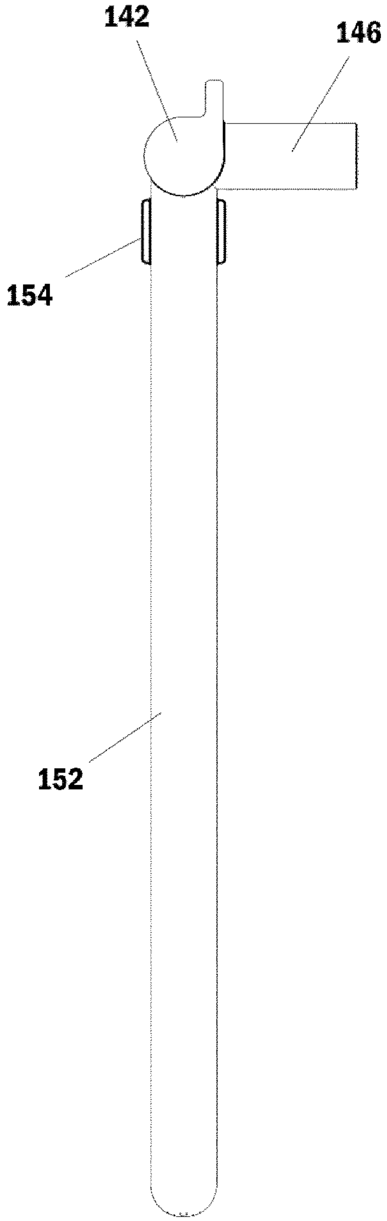
FIG. 14 is a detailed view of a pill straw and pill straw spout combination in storage orientation of a dual spout pill storage and swallowing assist bottle device, as contemplated by the present disclosure.
Figure 15:
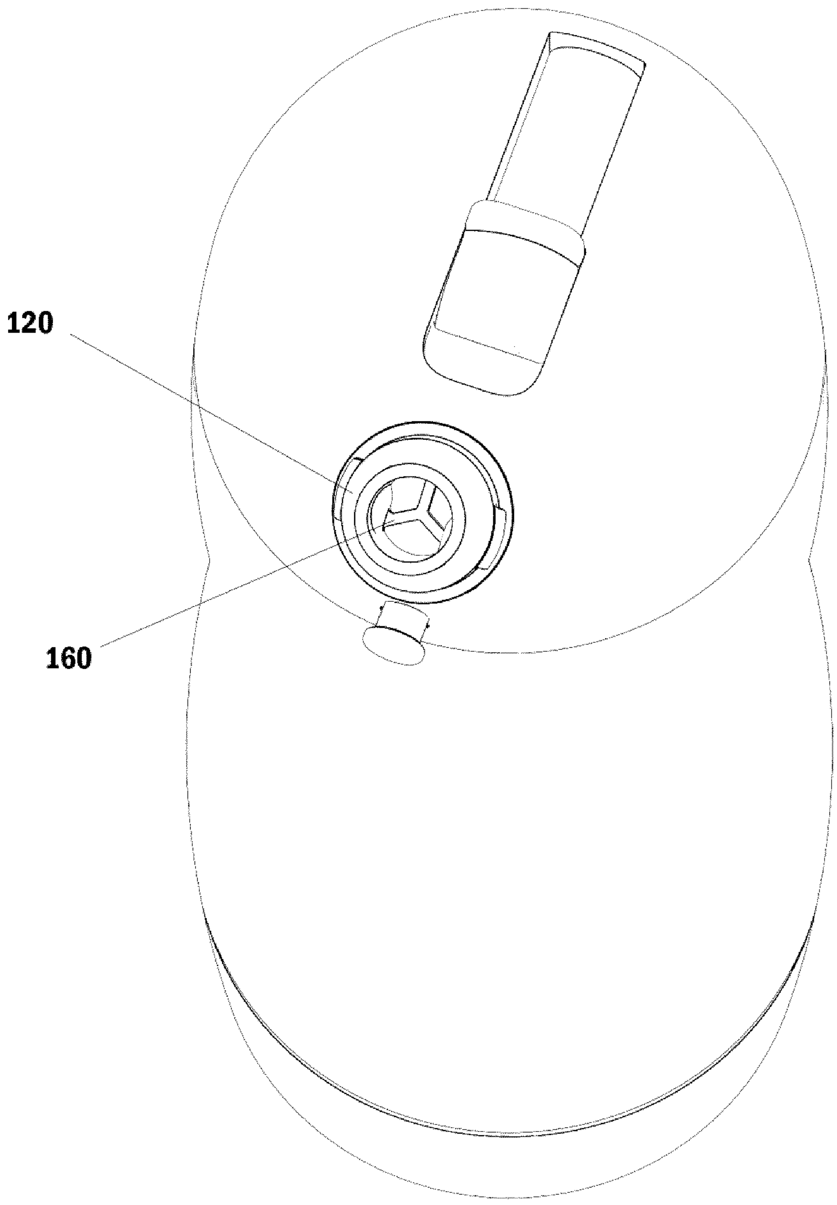
FIG. 15 is an isometric perspective view of a drinking spout pill retainer insert of a dual spout pill storage and swallowing assist bottle device, as contemplated by the present disclosure.

The illustrations of FIGS. 1-15 illustrate a dual spout pill storage and swallowing assist bottle device, as contemplated by the present disclosure. The device may comprise, generally, a main body 100, a main body lid 102, a drinking spout 120, and a pill straw 152 and pill straw spout 142 combination.

The main body 100 may comprise, generally, a cylindrical container having an open top, a closed bottom surface, a perimeter wall, and a central cavity. The closed bottom surface and perimeter wall may comprise a single layer of uniform material construction, or may comprise a multiple-layer construction consisting of multiple materials. In an embodiment comprising multiple materials the plurality of materials may include one material appropriate for providing structural support to the main body 100, another material appropriate for providing insulation to the main body 100, and another material appropriate for providing anti-microbial characteristics to the main body 100.

The main body 100 may further comprise a body to storage attachment 116 located near or at the bottom surface of the main body 100, and a body to lid attachment 110 located near or at the open top of the main body 100. The body to storage attachment 116 and body to lid attachment 110 may each comprise one half of any appropriate mechanism for attachment, though may each comprise different mechanisms for attachment depending on the particular embodiment of the device. By way of example, the body to storage attachment 116 may comprise one half of a slotted attachment mechanism while the body to lid attachment 110 may comprise one half of a screw-on mechanism.

The perimeter wall of the main body 100 may comprise a cylinder having a substantially consistent diameter from the open top of the main body 100 to the closed bottom of the main body 100. In some embodiments the perimeter wall of the main body 100 may, instead, have a varying diameter from one end to the other for aesthetic of functional purposes. The perimeter wall of the main body 100 may further comprise an integrated traction mechanism such as, for example, depressed finger grooves, an attached handle, or any other appropriate mechanism.

The main body lid 102 may comprise, generally, a disc-shaped cap having a closed top surface, an open bottom, a perimeter wall, and a central cavity. The closed top surface and perimeter wall may comprise a single layer of uniform material construction, or may comprise a multiple-layer construction consisting of multiple materials. In an embodiment comprising multiple materials the plurality of materials may include one material appropriate for providing structural support to the main body lid 102, another material appropriate for providing insulation to the main body lid 102, and another material appropriate for providing anti-microbial characteristics to the main body lid 102.

The main body lid 102 may further comprise a lid to body attachment located near or at the open bottom of the main body lid 102. The lid to body attachment may comprise one half of any appropriate mechanism for attachment complementary to the mechanism of attachment selected for the body to lid attachment 110. By way of example, in an embodiment wherein the body to lid attachment 110 comprises one half of a screw-on mechanism the lid to body attachment may comprise the complementary second half of the screw-on attachment mechanism. In this way the lid to body attachment and, thus, the main body lid 102, may be reversibly attached to the body to lid attachment 110 and the main body 100.

The main body lid 102 may further comprise a drinking spout 120, which may be any appropriate outcropping from the closed top surface of the main body lid 102, the perimeter wall of the main body lid 102, or a combination thereof. The drinking spout 120 may further comprise a central opening through its entire structure that creates a path from the central cavity of the main body lid 102 to the outer side of the device. By this design, the tilting of the device by a user for drinking may allow fluid to pass through the drinking spout 120 and into the user's oral cavity for normal drinking.

The main body lid 102 may further comprise a straw spout recess 140, which may be any appropriate indentation within the closed top surface of the main body lid 102 into which may be installed a pill straw spout 142. The pill straw spout 142 may comprise a structure having a straw spout hinge 144, a straw spout cylinder 146, a straw spout central opening 148, and a straw spout lever 150. The straw spout hinge 144 may be any appropriate hinge connecting the pill straw spout 142 to the straw spout recess 140 and allowing the pill straw spout 142 to articulate relative to the main body lid 102. By way of example, the straw spout hinge 144 may comprise a circular or disc-shaped protrusion that fits into a circular or disc-shaped receiver in the straw spout recess 140, which may allow the pill straw spout 142 to travel in an arc from zero degrees to ninety degrees relative to the closed top surface of the main body lid 102.

The straw spout cylinder 146 may comprise a hollow cylinder extending from the straw spout hinge 144, and the traveling in an arc from zero degrees to ninety degrees relative to the closed top surface of the main body lid 102 may cause the straw spout cylinder 146 to project upwards from the main body lid 102. The straw spout cylinder 146 and straw spout hinge 144 combination may further comprise a straw spout central opening 148, which may be aligned with an opening in the straw spout recess 140 when the pill straw spout 142 is articulated, that creates a path from the central cavity of the main body lid 102 to the outer side of the device. The pill straw spout 142 may further comprise a straw spout lever 150, which may be any appropriate tab or protrusion designed to provide traction or leverage on the pill straw spout 142 and facilitate its articulation by a user.

The main body lid 102 may further comprise a pill straw receiver attached within the central cavity of the main body lid 102 and aligned with the opening in the straw spout recess 140 and straw spout central opening 148 when the pill straw spout 142 is articulated.

The dual spout pill storage and swallowing assist bottle device may further comprise a pill straw 152, which may further comprise a straw to lid attachment 154 and a plurality of pill straw inlets 156. The pill straw 152 may comprise a hollow cylindrical shape having an open top and a closed bottom surface. The straw to lid attachment 154 may be attached near or at the open top of the pill straw 152 and may comprise one half of any appropriate mechanism for attachment. The pill straw receiver may comprise any appropriate mechanism for attachment complementary to the mechanism of attachment selected for the straw to lid attachment 154. By way of example, in an embodiment wherein the straw to lid attachment 154 comprises one half of a slotted attachment mechanism the pill straw receiver may comprise the complementary second half of the slotted attachment mechanism. In this way the straw to lid attachment 154 and, thus, the pill straw 152, may be reversibly attached to the pill straw receiver and the main body lid 102.

The plurality of pill straw inlets 156 may comprise a plurality of openings in the closed bottom surface of the pill straw 152 sufficient to allow for the passage of fluid when a vacuum is applied. By this design, a sucking action by a user for drinking may allow fluid to pass through the pill straw 152 and pill straw spout 142 and into the user's oral cavity for normal drinking. A pill placed into the pill straw 152 may be held within the device, and the sucking action by a user for drinking may allow fluid to pass through the pill straw 152 and pill straw spout 142 and into the user's oral cavity along with the pill for fluid-assisted swallowing.

The dual spout pill storage and swallowing assist bottle device may further comprise a drinking spout cap 122, which may be any cap appropriate for fitting over the drinking spout 120 of the selected embodiment. The drinking spout cap 122 may be attached to the drinking spout 120 by any appropriate mechanism such as, for example, a friction fit mechanism, a screw-on mechanism, a pop-fit mechanism, or other appropriate mechanism. The drinking spout cap 122 may further comprise a cap to arm attachment 124, which may be attached to an arm to cap attachment 128 of a spout cap arm 126. The spout cap arm 126 may further comprise an arm to lid attachment 130, which may be attached to a cap arm anchor point 132 attached on or integrated into the main body lid 102 or main body 100.

The spout cap arm 126 may comprise any appropriate flexible device for keeping the drinking spout cap 122 attached to the dual spout pill storage and swallowing assist bottle device while also allowing for the drinking spout cap 122 to be removably installed on the drinking spout 120. By way of example, the spout cap arm 126 may comprise a plastic, fabric, or leather strap, and the arm to cap attachment 128 may be glued, stitched, or pressed onto the cap to arm attachment 124 while the arm to lid attachment 130 may be glued, stitched, or pressed onto the cap arm anchor point 132. The cap arm anchor point 132 may be any attachment point appropriate for receiving the arm to lid attachment 130 such as, for example, a post, slot, button, or other similar mechanism.

In some embodiments the dual spout pill storage and swallowing assist bottle device may further comprise a storage component 104. The storage component 104 may comprise, generally, a disc-shaped cap having an open top, a closed bottom surface, a perimeter wall, and a central cavity. The closed bottom surface and perimeter wall may comprise a single layer of uniform material construction, or may comprise a multiple-layer construction consisting of multiple materials. In an embodiment comprising multiple materials the plurality of materials may include one material appropriate for providing structural support to the storage component 104, another material appropriate for providing insulation to the storage component 104, and another material appropriate for providing anti-microbial characteristics to the storage component 104.

The storage component 104 may further comprise a storage to body attachment 114 located near or at the open top of the storage compartment 104. The storage to body attachment 114 may comprise one half of any appropriate mechanism for attachment complementary to the mechanism of attachment selected for the body to storage attachment 116. By way of example, in an embodiment wherein the body to storage attachment 116 comprises one half of a slotted attachment mechanism the storage to body attachment 114 may comprise the complementary second half of the slotted attachment mechanism. In this way the storage to body attachment 114 and, thus, the storage compartment 104, may be reversibly attached to the body to storage attachment 116 and the main body 100.

The central cavity of the storage component 104 may comprise an open cavity to permit a user to place objects within the storage component 104. In some embodiments the central cavity of the storage compartment 104 may further comprise dividers or containers for storing various items separately from one another. By way of example, the central cavity of the storage component 104 may be intended to store a user's pills, and may be divided into seven compartments so that the user may store the pills needed for one week.

In some embodiments the dual spout pill storage and swallowing assist bottle device may comprise variations that remain within the spirit and scope of the present disclosure. By way of a first example, the drinking spout 120 may further comprise an insert receiver into which may be placed a drinking spout pill retainer insert 160. Such an insert may be permanently installed or removably installed by the user to convert the drinking spout 120 into a secondary pill swallowing assist device.

A pill placed on the drinking spout pill retainer insert 160 may be held within the drinking spout 120, and the tilting of the device by the user for drinking may allow fluid to pass through the drinking spout pill retainer insert 160 and into the user's oral cavity along with the pill. By this design, the user may employ a fluid-assisted swallowing technique instead of the vacuum suction technique facilitated by the pill straw 152 and pill straw spout 142 combination.

By way of a second example, the central cavity of the storage component 104 may comprise an undivided cavity for general storage of larger pills or secondary items while an additional divided storage container may be integrated into the perimeter wall of the main body 100.

The dual spout pill storage and swallowing assist bottle device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the dual spout pill storage and swallowing assist bottle device may be substantially constructed of one or more materials of silicone, plastic, acrylic, polycarbonate, steel, aluminum, brass, fiberglass, carbon fiber, or combinations thereof. In some embodiments the various components of the device may be coated, lined, or otherwise insulated to prevent contamination of the device. In one embodiment the material of construction may vary from one component to the next within the system.

In one embodiment the dual spout pill storage and swallowing assist bottle device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

According to another embodiment, there is provided a method of using the dual spout pill storage and swallowing assist bottle device of the present disclosure to transfer a pill to the stomach of a user. The method generally includes: placing a pill on top of a user's tongue (or in other embodiments, on the drinking spout pill retainer insert of the bottle device); placing the user's lips over the drinking spout of the bottle device to form a seal around the drinking spout; tilting the user's head back and squeezing the main body of the bottle device to propel a fluid contained within the main body into the user's mouth to allow the user to swallow the pill and fluid simultaneously thereby transferring the pill to the user's stomach. The drinking spout is configured and shaped such that placement of the user's lips across the drinking spout forms a tight seal to prevent air from being transferred into the mouth which is known to interfere with pill swallowing. The drinking spout is also configured and shaped such that when the main body is squeezed a constant force of fluid is propelled into the user's mouth to assist the user in swallowing the pill.

In an alternative embodiment, the pill straw and pill straw spout may be used to assist the user in swallowing the pill. In this embodiment, the pill straw spout is articulated upwards from the main body lid and a pill is placed inside the pill straw spout/pill straw. The user's head is then tilted downward towards the pill straw spout/pill straw of the bottle device. The user's lips may then be placed across the pill straw spout and the main body of the bottle device can be squeezed to propel fluid within the main body and the pill in the pill straw spout/pill straw upwards and into the user's mouth. The user can then swallow the pill and fluid simultaneously thereby transferring the pill to the user's stomach.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A method of transferring a pill to a user's stomach using a pill swallowing assist bottle device, said bottle device comprising:

(i) a main body having an internal cavity holding a consumable liquid;

(ii) a main body lid configured to be reversibly attached to the main body;

(iii) a pill straw device attached to the main body lid with an attachment mechanism;

wherein the pill straw device further comprises a lower region surface and at least one pill straw inlet through the lower region surface of the pill straw device;

wherein said method comprises:

(a) placing a pill inside the pill straw device;

(b) placing the user's lips over the pill straw device; and (c) squeezing the main body of the bottle device to propel the consumable liquid within the cavity through the at least one pill straw inlet and to propel the pill in the pill straw device upwards into the user's mouth allowing the user to swallow the pill and consumable liquid simultaneously thereby transferring the pill to the user's stomach.

2. A method as claimed in claim 1, wherein the pill straw device comprises a pill straw and a pill straw spout.

3. The method of claim 2, wherein: the pill straw is configured to be reversibly attached to the main body lid.

4. The method of claim 2, wherein the pill straw spout is reversibly deployable into a straw spout recess in the main body lid.

5. The method of claim 4, wherein the main body further comprises a central cavity; and wherein the pill straw device is located within the central cavity of the main body when the pill straw is reversibly attached to the main body lid and the main body lid is reversibly attached to the main body.

6. The method of claim 1, wherein the lower region of the pill straw device further comprises a bottom surface, and wherein the at least one pill straw inlet comprise a plurality of openings through the bottom surface of the pill straw device.

7. A bottle apparatus for use in transferring a pill to a user's stomach using a pill, said bottle apparatus comprising:

(i) a main body having an internal cavity holding a consumable liquid;

(ii) a main body lid configured to be reversibly attached to the main body;

(iii) a pill straw device attached to the main body lid with an attachment mechanism;

wherein the pill straw device further comprises a lower region surface and at least one pill straw inlet through the lower region surface of the pill straw device;

wherein in operation by a user, when a pill is placed inside the pill straw device and the user's lips are placed over the pill straw device; and upon squeezing the main body of the bottle device, the consumable liquid within the cavity is propelled through the at least one pill straw inlet and propels the pill in the pill straw device upwards into the user's mouth allowing the user to swallow the pill and consumable liquid simultaneously thereby transferring the pill to the user's stomach.

8. A bottle apparatus as claimed in claim 7, wherein the pill straw device comprises a pill straw and a pill straw spout.

9. A bottle apparatus as claimed in claim 8, wherein: the pill straw is configured to be reversibly attached to the main body lid.

10. A bottle apparatus as claimed in claim 7, wherein the pill straw spout is reversibly deployable into a straw spout recess in the main body lid.

11. A bottle apparatus as claimed in claim 7, wherein the lower region of the pill straw device further comprises a bottom surface, and wherein the at least one pill straw inlet comprise a plurality of openings through the bottom surface of the pill straw device.

12. A bottle apparatus as claimed in claim 11, wherein the main body further comprises a central cavity; and wherein the pill straw device is located within the central cavity of the main body when the pill straw is reversibly attached to the main body lid and the main body lid is reversibly attached to the main body.

* * * * *